US006985524B1

(12) United States Patent
Borchers

(10) Patent No.: US 6,985,524 B1
(45) Date of Patent: Jan. 10, 2006

(54) APPARATUS AND METHOD FOR ADJUSTING REAL TIME VIDEO TO COMPENSATE FOR COLOR BLINDNESS

(75) Inventor: Gregory Eugene Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/388,831

(22) Filed: Sep. 1, 1999

(51) Int. Cl.
 *H04B 1/66* (2006.01)
(52) U.S. Cl. .................... 375/240; 348/62; 348/649; 348/651; 348/78; 345/549; 345/600; 351/200; 351/239; 351/237
(58) Field of Classification Search ............... 375/240; 348/649, 607, 672, 708, 62, 651, 549, 600, 348/78; 209/237, 238; 345/601, 600, 549; 351/200, 239, 237
See application file for complete search history.

(56) References Cited

U.S. PATENT DOCUMENTS

| 5,359,675 A | * | 10/1994 | Siwoff .......................... 348/62 |
| 5,475,835 A | * | 12/1995 | Hickey ........................ 395/600 |
| 5,589,898 A | | 12/1996 | Atkinson |
| 5,677,741 A | * | 10/1997 | Yui ............................. 348/649 |
| 5,684,563 A | | 11/1997 | White |
| 5,986,642 A | * | 11/1999 | Ueda et al. .................. 345/150 |

OTHER PUBLICATIONS

"Color displays for the color blind," by Jan Walraven & Johan W. Alferdinck, The Fifth Color Imaging Conference: Color Science, Systems, and Applications, pp. 17-22.
"Digital Color Management Encoding Solutions," by Edward J. Giorgianni and Thomas E. Madden, ISBN 0-201-63426-0; pp. 20-26; pp. 55-101; pp. 181-188; pp. 258-282; pp. 283-295; pp. 439-445; pp. 499-535.

* cited by examiner

*Primary Examiner*—Shawn S. An
(74) *Attorney, Agent, or Firm*—Marger Johnson & McCollom, P.C.

(57) ABSTRACT

An apparatus and a method are provided for adjusting real time video to compensate for color blindness. A video system includes a decoder that receives and decodes a video signal into original color signals. A processor receives the original color signals and outputs color signals that are adjusted for compensating for a selected one of a number of precharacterized types of color blindness. A screen receives the adjusted color signals and displays images adjusted from the original to compensate for the selected type of color blindness. The adjusted signals are derived from the original signals by one color gamut adjustment for each type of color blindness. The color gamut adjustments are generated by characterizing at least the known, major color deficiencies, and then generating color gamut transforms to fit more range of actual color contrast within the range of perception of the color blind. Each transform is stored in a memory as a lookup table, and looked up by the processor. Software controls whether any color adjustment is to take place, and if so which one of the available mappings is to be used by showing a sample image for each one of the color transforms.

12 Claims, 6 Drawing Sheets

APPARATUS AND METHOD FOR ADJUSTING REAL TIME VIDEO TO COMPENSATE FOR COLOR BLINDNESS

BACKGROUND OF THE INVENTION

1. Field of the Invention

The present invention is related to the field of compensating for color vision anomalies of humans, and more specifically to real time video systems that adjust the color of the displayed images so as to present more color contrast within the range of perception of viewers suffering from color vision deficiencies.

2. Description of the Related Art

Color is used increasingly to encode visual information. A comprehensive description is found in a book titled Digital Color Management, Encoding Solutions, by Giorgianni and Madden, Addison Wesley, 1998. The book describes standards for representations of color in color space, such as those promulgated by CIE (Commission Internationale de l'Éclairage) in various coordinate systems (-LUV, -XYZ, -LAB, etc.).

It is well documented that, as compared to a healthy majority, a fraction of the population suffers from color vision deficiencies. These people are more commonly called color blind. Such deficiencies do not permit them, when viewing color images, to detect certain colors or discern color contrasts.

Color blindness is discussed in an article titled "Color displays for the color blind", The Fifth Color Imaging Conference, pp. 17–22, by Jan Walraven and Johan W. Alferdinck, that is incorporated herein by reference. Importantly, color blindness is characterized in terms of a diagram that is reproduced herein as FIG. 1.

FIG. 1 is a chromaticity diagram in CIE-XYZ color space. This diagram appears in the art frequently in color. The range (gamut) seen by most people is within an RGB triangle, defined by corner points R (red), G (green), and B (blue). The colors are digitally distributed within this triangle which has an area N.

The diagram also includes results of simulations of the perceptual constraints of anomalous color vision. As such, the diagram characterizes the visions of a protanomalous and of a deuteranomalous observer as triangles having respective areas P and D. The colorblind do not see color or color contrast outside their triangle.

The vision triangles of the color blind are smaller than, and substantially contained within the RGB triangle of a healthy person. The diagram thus properly presents color-blindness as a deficiency in range (gamut) of perception of color compared to the range of most people.

It is desirable to generate real time video for digital TV and related applications, that is adjusted for colorblind people.

Little work has been done in this direction. U.S. Pat. No. 5,589,898 addresses color compensating for computer screens. However, even that patent admits that its own disclosure is not applicable to real time video, such as TV screens and video screens (column 7, lines 2–7).

BRIEF SUMMARY OF THE INVENTION

The present invention overcomes these problems and limitations of the prior art.

Generally, the present invention provides an apparatus and a method for adjusting real time video to compensate for color blindness. The apparatus of the invention is a video system that includes a decoder which receives and decodes a video signal into original color signals. A processor receives the original color signals and outputs color signals that are adjusted for compensating for a selected one of a number of precharacterized types of color blindness. The invention further includes a screen that receives the adjusted color signals and displays images that are adjusted from the original, so as to compensate for the selected type of color blindness.

The color signals are associated with respective series of ordered sets of samples that represent values of respective contents of red, green and blue color. The adjusted samples are derived from the original samples by one color gamut adjustment for each type of color blindness.

The method of constructing the video system includes generating the mappings and storing them into the memory. The mappings are generated by characterizing at least the known, major color deficiencies, and then generating color gamut transforms to fit more range of actual color contrast within the range of perception of the color blind. Each color transform is stored in a memory as a mapping.

A processor is then placed within the signal path of the series of ordered sets of original samples for the red, green and blue, before they reach the screen. The processor uses the samples to look up from the memory adjusted samples for the screen. Further, software is implemented, to work preferably in conjunction with a remote control device of the screen. The software controls whether any color adjustment is to take place, and if so which one of the available mappings is to be used.

The method of using the video system of the invention includes the user running the software. A static reference image of a full color palette is color transformed through each one of the mappings, to create respectively adjusted sample images. The reference image and the sample images are then shown to the viewer, who selects the one with the best color and color contrast for him. Then the system applies to the entire screen the mapping that was used to generate the selected image.

The present invention opens up a world of more enjoyable TV viewing to color blind people. TV sets can be sold including the memory as an optional feature. The vast majority of colorblind people can adjust the TV in a way that shows them the images most rich in color.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT(S)

As has been mentioned, the present invention provides a video system and methods for outputting to a screen signals for displaying real time video that is adjusted from the original to compensate for the colorblind.

Figure 2:
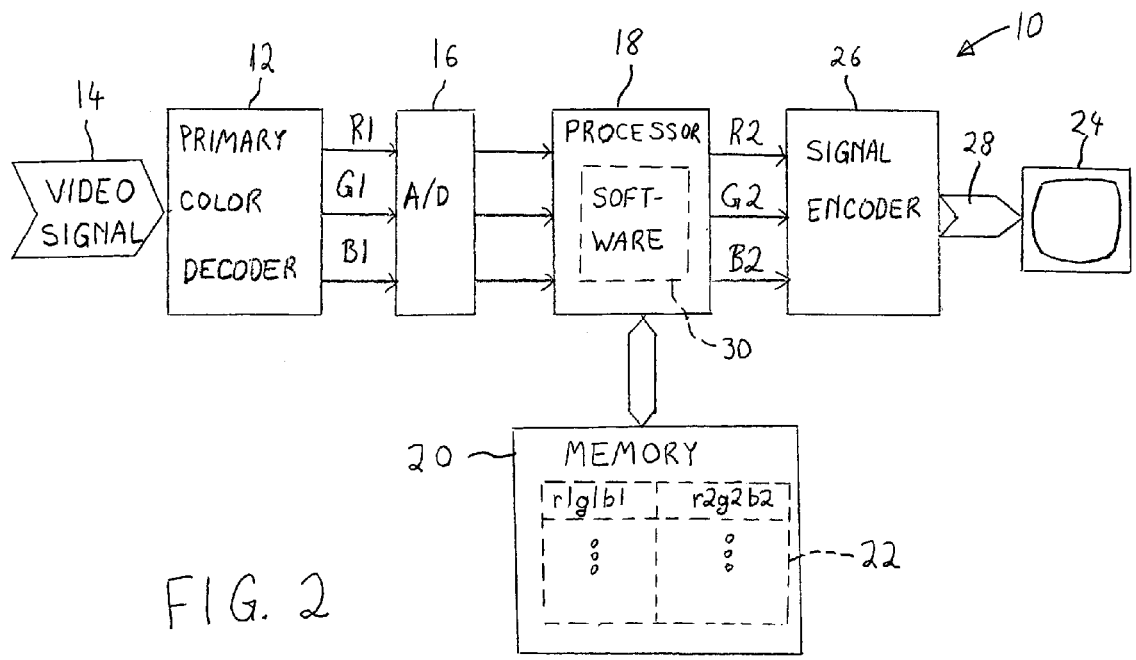
FIG. 2 is a block diagram of a video system made according to the invention.

The apparatus of the invention is now described with reference to FIG. 2. The apparatus includes a real time video system 10. System 10 includes a decoder 12 that is also known as primary color decoder and means for decoding a video signal. Decoder 12 receives a real time video signal 14 that can be any real time video signal that has encoded original color images, such as a color TV signal. The decoder is made as is known in the art, or can be a decoder already present with a system that is being retrofitted according to the invention.

Decoder 12 decodes signal 14 into at least one original color signal associated with a color of the original image. Preferably it decodes it into original color signals R1, G1, B1. These signals can be in any set of colors that are designated as primary colors. Most commonly the designated primary colors are red, green and blue. These are so designated because they are also the fundamental colors seen by the human eye.

In any event, the original color signal is associated with a series of ordered sets of original samples. The samples are voltages that encode values of content of color for each pixel of each frame in digital or analog form. If encoded in analog form, an A/D converter 16 may also be necessary. They are ordered in the sense that each pixel is characterized by three in this case values, the first one for content of red, the second one for content of green and the third one for content of blue color. They are a series in that they are a series of data for the pixels of the stream of frames containing the original color images. The original color signal is preferably decoded into the series of ordered sets of original samples by the decoder, A/D converter 16 if necessary, and the processor described below.

System 10 further includes a processor 18. The processor is coupled with the decoder, and receives the series of ordered sets of original samples. The processor includes software features capable of performing various processes, and is also known as means for performing the various processes. A person skilled in the art of writing software will be able to implement the invention in view of the present description.

In the preferred embodiment, the video system further includes a memory 20 that is coupled with the processor. The memory preferably includes a lookup table 22. The lookup table effectuates a color gamut adjustment for a first type of color blindness, as will be described in more detail below. The memory can be an EPROM, and the lookup table is stored by burning in the EPROM.

The system may include means for combining the original samples r1, g1, b1, of a single ordered set (r1, g1, b1) to generate a single sample r1g1b1 for inputting into the memory. Combining can be by simply concatenating the samples to generate a new digital value, such as of fixed length. Alternately, the processor itself converts the color content values encoded in the three signals R1, G1, B1, into a single value r1g1b1.

The single value r1g1b1 is used as an input to the lookup table of the memory, for an example as an address. The memory can read out a single sample r2g2b2 for each input ordered set of original samples, whether or not they have been encoded as a single value r1g1b1. It is possible to have systems where each color is treated separately, but that would not be satisfactory. At the very least, it would deprive the designer of versatility in designing gamut adjustments for each type of color blindness, as will be appreciated below.

If, as is preferred, the memory reads out a single sample r2g2b2 for each input ordered set of original samples, then from it there is extracted an ordered set of adjusted samples (R2, G2, B2). This can be performed by the processor, or a separate extraction means can be included. Extraction can be the inverse process of combining, although that is not necessary.

There might not be an exact original value in the mapping for the original value provided. In this case a process of interpolation may be employed as known.

The adjusted samples are values of contents of preferably the same primary colors, derived from the original samples by one color gamut adjustment for each type of color blindness.

Strictly speaking, the memory is not necessary. For some types of color blindness, the correcting gamut transforms may be accommodated computationally only, as will be appreciated from the example of FIG. 7 that is described in more detail below. Principles of analytic geometry can be applied. An advantage is that they will inherently perform all interpolation, which is not avoided by the memory look up method in the strictest sense.

A real time series of adjusted samples is thus formed, that define an adjusted color signal. Therefore the adjusted color signal is associated with a series of ordered sets of samples adjusted from the original samples according to a first color gamut adjustment predefined for the first type of color blindness. At the very least, the processor outputs at least a first color signal adjusted from the original color signal for compensating for the first type of color blindness.

System 10 further includes a screen 24 coupled with the processor. The screen is made as is known in the art. The screen is typically suitable for receiving video signal 14 (before or after decoder 12), and for displaying the color images encoded in it. However, the screen now receives the adjusted color signal, and therefore displays in real time color images adjusted from the original images for the first type of color blindness.

The idea of the invention is to include a color gamut adjustment stage in the signal path between signal 14 and screen 24, and display the resulting adjusted images. Depending on the exact screen selected, a signal encoder 26 may be needed to convert the series of adjusted samples into an adjusted color signal 28 suitable for the screen, as will be easily discerned by a person skilled in the art. In other words, signal 28 will be of the same format as signal 14, etc.

Alternately, if the screen is suitable for receiving separate R, G, B signals, then the color gamut adjustment stage is placed as close to the screen as possible.

According to the preferred embodiment, multiple lookup tables (also known as mappings or gamut mappings or transforms) can be stored in the memory, to compensate for multiple types of color blindness. Accordingly, the processor can output a second color signal that is adjusted from the original color signal for compensating for the second type of color blindness.

The video system further includes means for selecting to output one of the first and the second adjusted color signals. The selecting means is preferably implemented by software 30 that can reside in the processor, or in another processor of the video system. The software controls whether any color adjustment is to take place, and if so which one of the available gamut mappings is to be used. The software preferably works in conjunction with a remote control device of the screen.

A general method of the present invention for adjusting real time color images that are encoded in a video signal, which is suitable for producing a display on a screen, comprises the following steps:

First, the video signal is decoded into at least one original color signal associated with a color of the original image. Preferably more than one signals, one for each primary color, as described above.

Then the original color signals are used to generate an adjusted signal according to a first transform associated with a first type of color blindness. This is preferably accomplished by using the lookup table of the memory, as described above.

Then the adjusted signal is applied to the screen. This causes the screen to display color images that are adjusted from the original images for the first type of color blindness.

Figure 3:
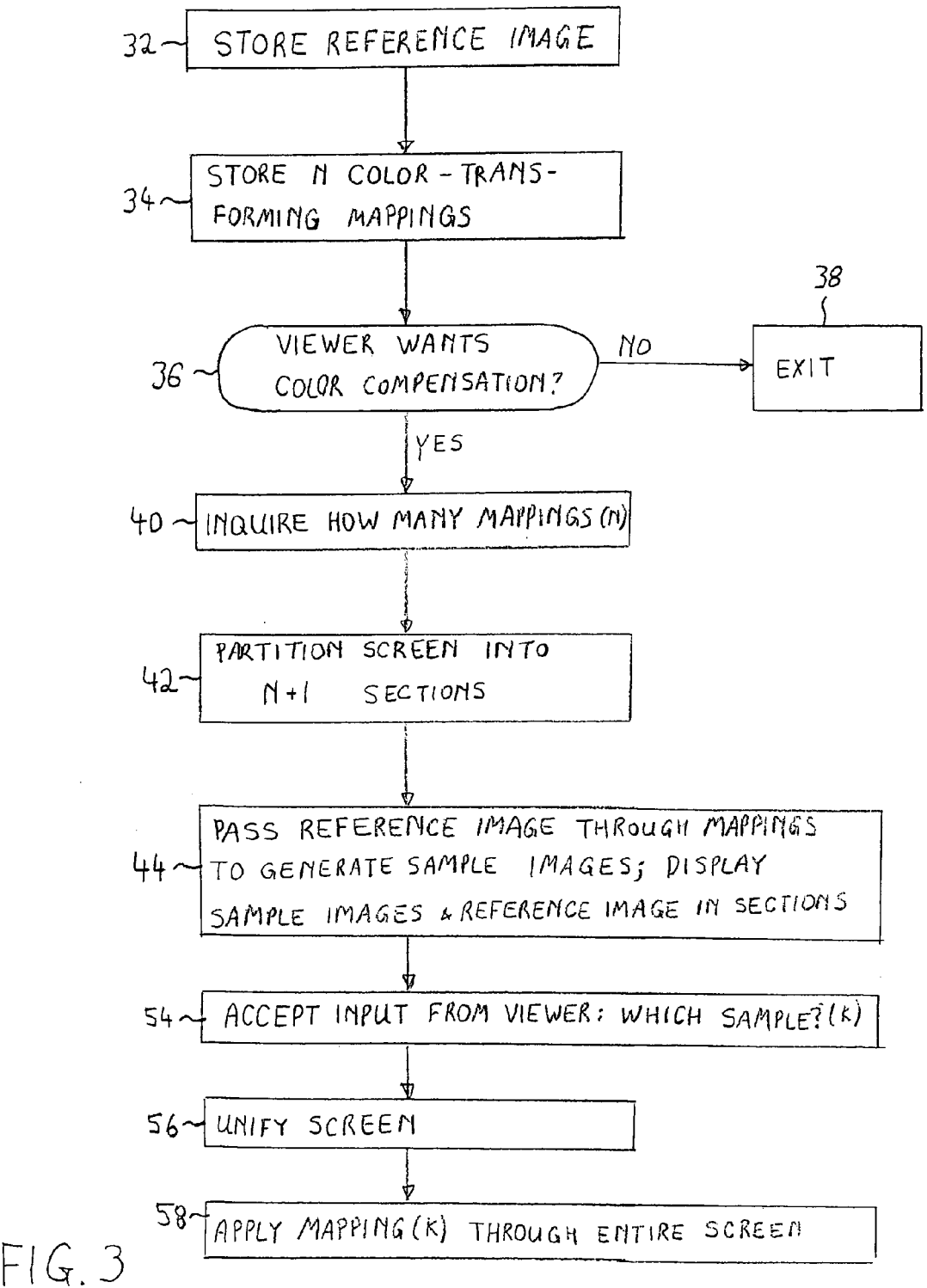
FIG. 3 is a flowchart describing a method according to the present invention.

A more detailed method according to the present invention is now described with reference to FIG. 3.

According to step 32, a color reference image is selected and stored, preferably in the memory. The color reference image is also called a palette.

Figure 4:
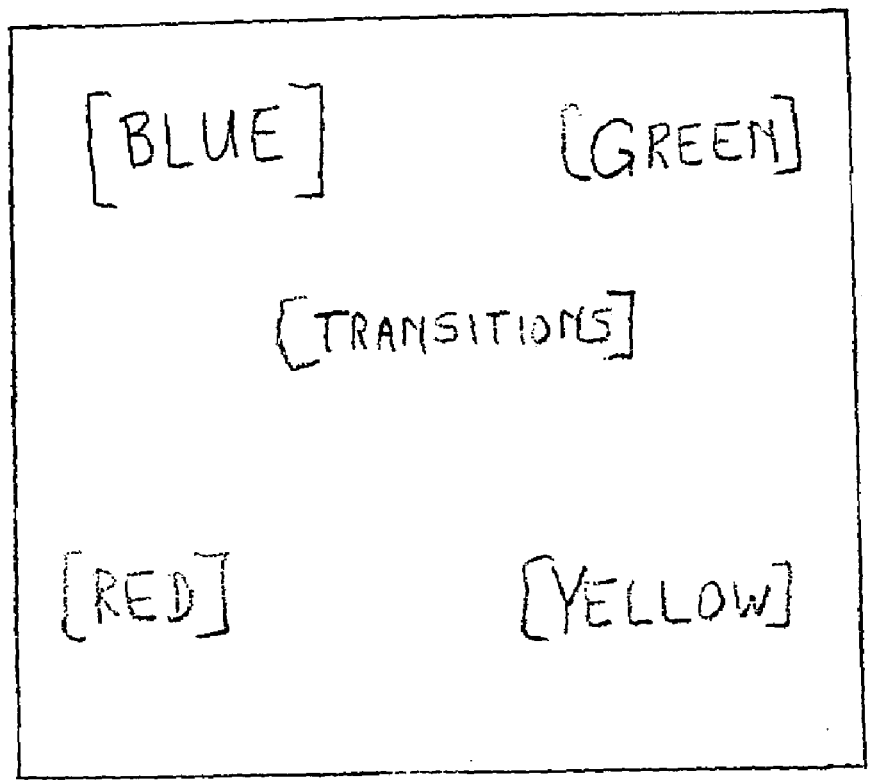
FIG. 4 is a black and white rendering of a color palette that can be used with the method of FIG. 3.

A black and white rendering of a sample palette is shown in FIG. 4, that is of a convenient rectangular shape. It is intended to depict colors in various (such as four) areas, and gradual transitions from one color to another. The transitions are for the viewer to evaluate contrast. As a person skilled in the art will easily understand, many palettes are possible. A preferred palette is one where a healthy person will see full color contrast in every area of it. Another possible palette is the image of FIG. 1 in full color, which is a standard found in many textbooks. An even more preferred palette is an actual scene selected to contain all the visible colors in good proportion. It is preferred because it will be easier to explain to the viewer what to look for.

Returning to FIG. 3, according to step 34, mappings are stored in the memory. The mappings are preferably lookup tables. The tables are derived as is described below.

According to step 36, the software, coupled with other screen control software asks the prospective viewer whether he desires color compensation. This preferably happens when the video system is turned on the first time, and then the questioning can be disabled. Or it can be enabled automatically once a year, to accommodate a new viewer, or a viewer with gradually developing color blindness. If the viewer does not want it, then the software exits (step 38).

The designer will appreciate that step 36 is not necessary. A TV manufacturer can implement all of the above, and call them "Color Contrast Selection Feature", without mentioning color blindness. The viewers might appreciate a better viewing option without comment.

According to optional step 40, the software can inquire how many mappings have been stored. This permits adapting to an upgraded memory situation. The answer is a number N.

Then the system gives options to the viewer, and permits him to select which types of correction he wants. This can be done serially. The preferred mode is to perform it simultaneously, as is described below.

According to step 42, the screen is partitioned into N+1 sections. For example, if three mappings are stored, the screen is partitioned into four sections.

According to step 44, the reference image is shown in its original form, and through the N mappings, one in each of the sections of the screen. Preferably the software also displays a number in each section, for subsequent selection by the viewer.

At the very least, the reference color image is used to generate at least one reference color signal associated with a color of the reference image, then an adjusted signal is generated from the reference color signal according to a tested transform associated with a tested type of color blindness, and then the adjusted signal is applied to the screen. This causes the screen to display a reference image adjusted for the tested type of color blindness.

Figure 5:
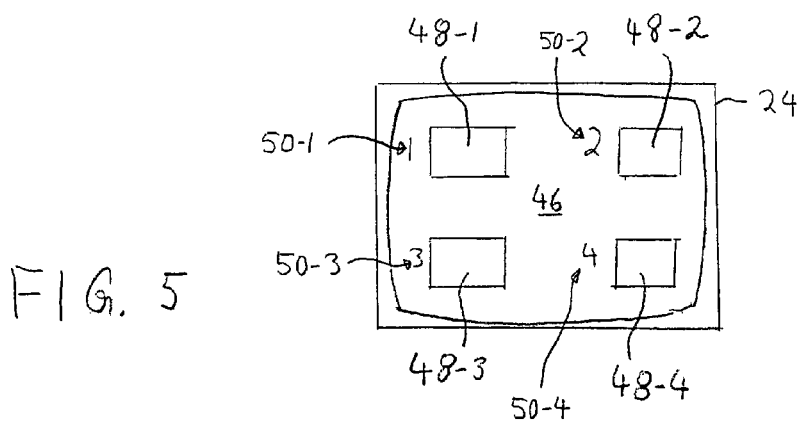
FIG. 5 is a diagram of a screen according to the invention during a test step of the method of FIG. 3.

At that time, the screen appears as seen in FIG. 5. Screen 46 shows four color palettes, represented by shaded rectangles 48-1, 48-2, 48-3 and 48-4. Of those, 48-1 is identical to the palette of FIG. 4, while the other three are transformed. In addition, corresponding selection numbers 50-1, 50-2, 50-3 and 50-4 are displayed. A healthy person would immediately see the most contrast in 48-1, and thus would input the corresponding selection number 50-1, that is a "1".

Returning to FIG. 3, according to step 54, the video system accepts an input from a viewer. The input is about which mapping is desirable, and is preferably made by a remote control unit. At the very least, the input is as to whether a shown adjusted reference image is desirable. As mentioned above, this input is typically from a remote control unit.

According to step 56, the partitioning of the screen is undone.

According to step 58, the selected mapping is applied through the entire screen. It is saved as a default, until changed.

Figure 6:
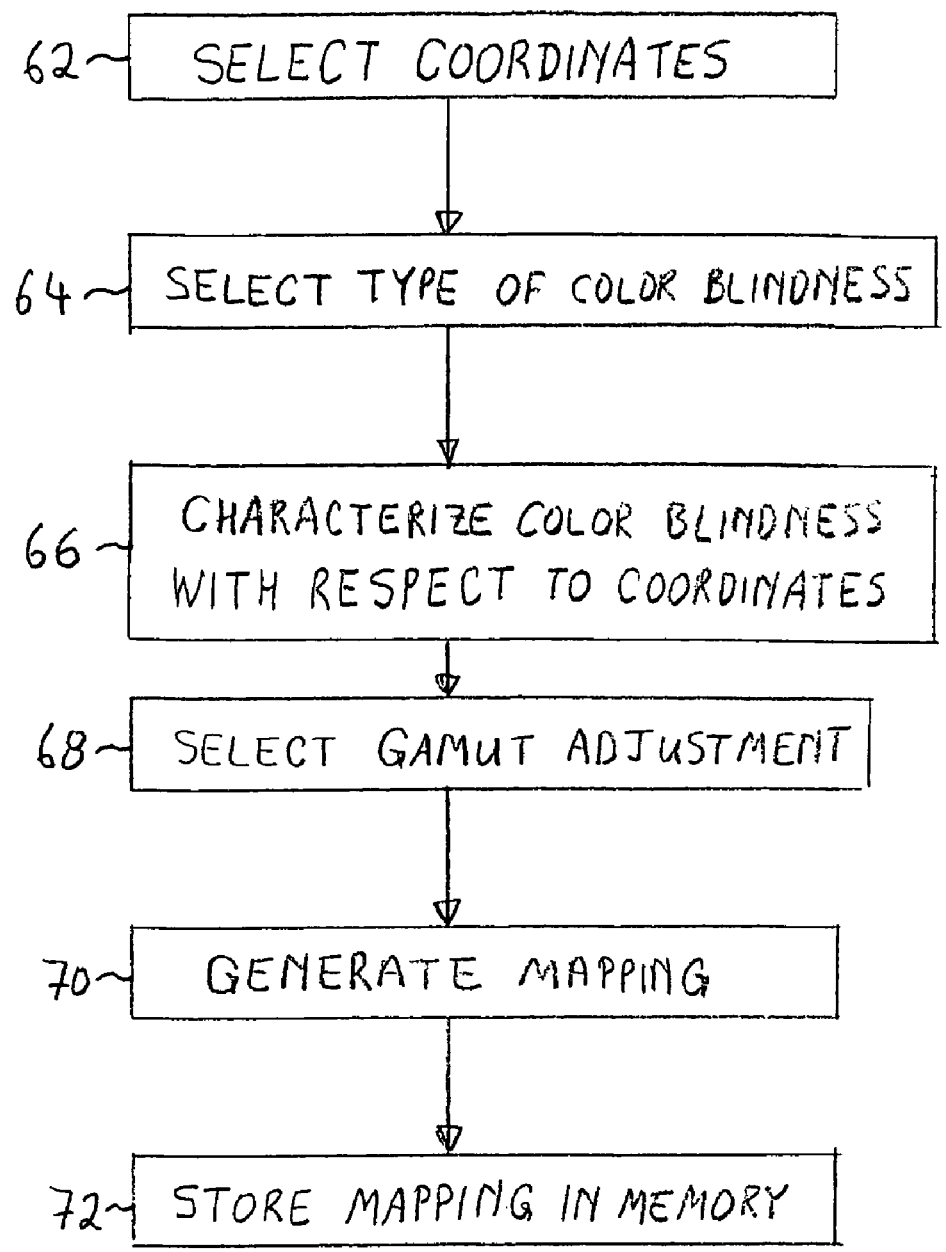
FIG. 6 is a flowchart describing a method for generating a mapping according to the present invention.

The method of generating the mappings is now described with reference to FIG. 6. As a first step 62, a set of coordinates is selected for defining a color space. The example of CIE-XYZ will be used, although other sets are possible.

As a second step 64, a type of color blindness is selected. A deuteranope will be selected for FIGS. 7 and 8, although again, that is not limiting. For the full practice of the invention, the process is repeated for all types of color blindness that will be stored in the memory.

Figure 1:
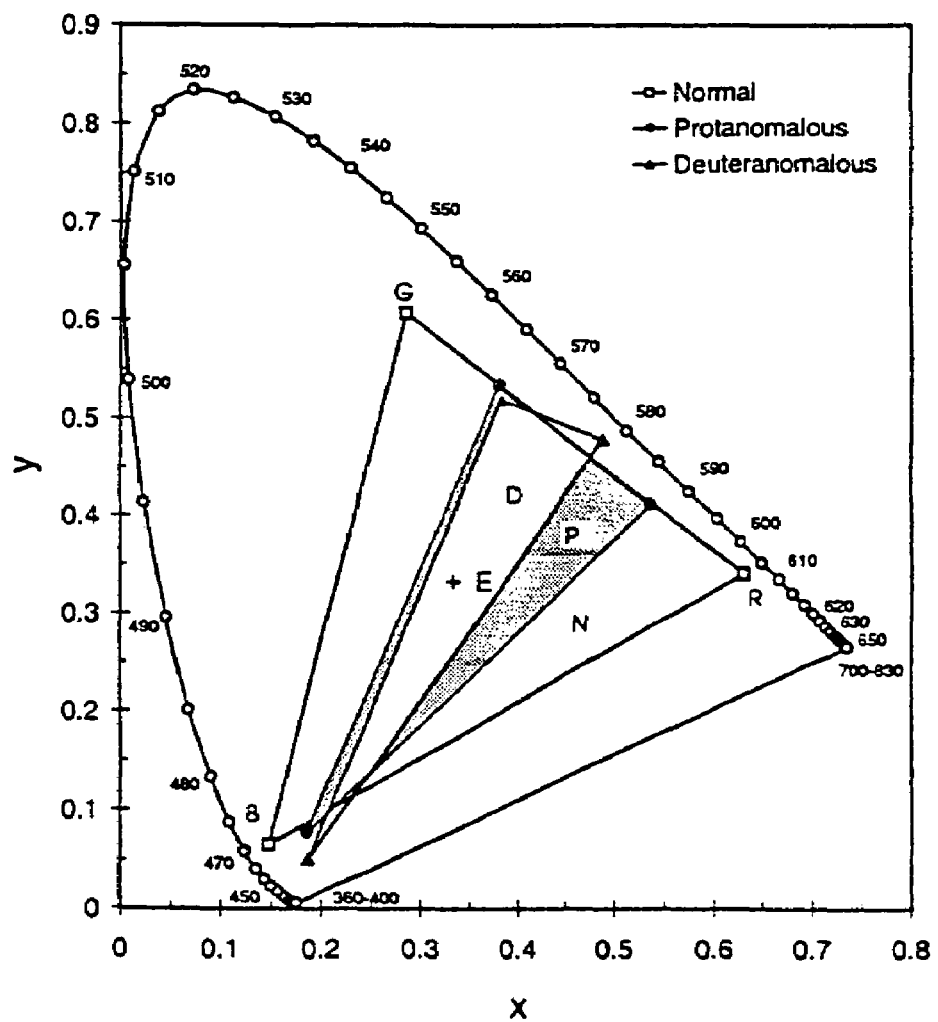
FIG. 1 is a prior art chromaticity diagram in color space according to the CIE-XYZ convention, showing the relative color perception ranges of a healthy person (N), and two specific types of color blind people, namely a protanope (P), and a deuteranope (D).

As a next step 66, the selected type of color blindness is characterized with respect to the coordinates as at least one discernible region in the color space. As seen in FIG. 1, for deuteranopia the discernible region is characterized as a triangle D that is largely within the normal range.

As a next step 68, a color gamut adjustment is selected that maps at least one region outside the discernible region into the discernible region. This will be shown in greater detail with reference to FIGS. 7 and 8.

As a next step 70, the mapping is generated. This includes generating correspondences between the original values and the adjusted values that perform the color gamut adjustment.

These are numeric values for (% red, % green, % blue), as an ordered set, for each pixel of the palette (i.e. every possible screen color).

As a next step 72, the original values and the adjusted values are stored in a look up table in the memory. It may be desirable to store the original values as addresses for the corresponding adjusted values.

Two sample gamut adjustments will now be described with reference to FIGS. and 8. As already mentioned above, they are for a deuteranope. The same conventions are used as in FIG. 1, and for the same regions.

Figure 7:
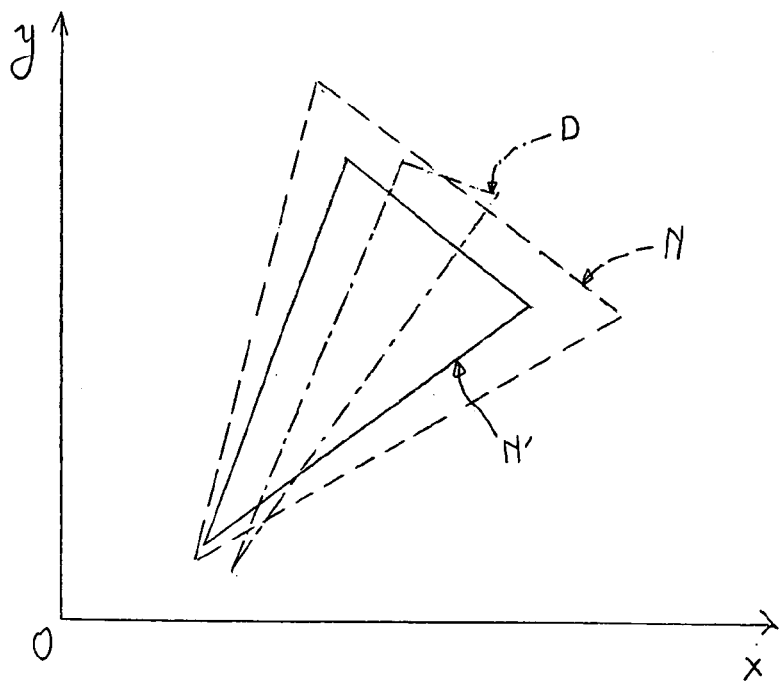
FIG. 7 is a chromaticity diagram in color space according to the CIE-XYZ convention, showing a first gamut mapping performed according to the present invention by uniformly contracting the range N of a healthy person into a contracted range N', so that more fits within the discernible range D of a deuteranope.

Referring to FIG. 7, a gamut adjustment is shown where the entire healthy range N is uniformly contracted into a smaller region N'. This way more of it fits within the discernible range D of a deuteranope. This is computationally intensive, because every pixel of the palette is "moved". This method results in minimized color skews, which are also uniform. However, the color contrast between adjacent colors is uniformly less sharp within the discernible range. This method can be implemented by computational adjustment (instead of looking up in a memory) better than the method of FIG. 8.

Figure 8:
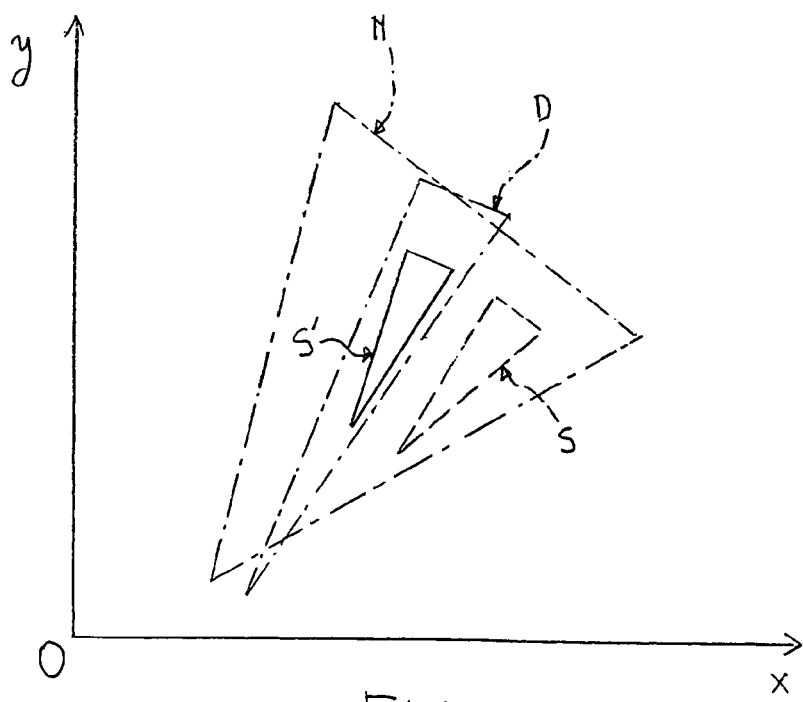
FIG. 8 is a chromaticity diagram in color space according to the CIE-XYZ convention, showing a second gamut mapping performed according to the present invention by shifting and rotating a segment S of the range N of a healthy person into a location S' that is within the discernible range D of a deuteranope.

Referring to FIG. 8, another gamut adjustment is shown where a segment S of the healthy range N is mapped into a location S' of the discernible range D of a deuteranope. Mapping involves shifting and/or rotating at least a portion of one of the regions. This method is computationally less intensive than that of FIG. 7, and local contrast is preserved. However, some features will be shown with a wholly unnatural color, and in the same color as other features.

A person skilled in the art will be able to practice the present invention in view of the present description, where numerous details have been set forth in order to provide a more thorough understanding of the invention. In other instances, well-known features have not been described in detail in order not to obscure unnecessarily the invention.

Having illustrated and described the principles of the invention in preferred embodiment(s) thereof, it should be readily apparent to those skilled in the art that the invention can be modified in arrangement and detail without departing from such principles. All modifications coming within the spirit and scope of the accompanying claims are claimed as follows.

The invention claimed is:

1. A real time video system for outputting to a screen signals for displaying color images that are adjusted for color blindness from original color images encoded in a real time video signal, the video system comprising:
a decoder for decoding the video signal into at least one original color signal associated with a color of the original image;
a compensation processor coupled with the decoder for receiving the original color signal, the compensation processor including a plurality of separate pre-calculated color point remappings that are configured to compensate for different types of color blindness, that are non-modifiable by a user of the video system, and are not customized by the user prior to and after a vision test is performed by the user, the compensation processor structured to remap the original color signal into multiple different color blind compensated signals by remapping color points from the original color signal, for compensating for multiple different types of color blindness; and
display circuitry structured to cause the screen to display an image using the original color signal and simultaneously displaying the same image using the multiple different color blind compensated signals thereby displaying multiple versions of the same image at the same time that compensate for different types of color blindness prior to the user providing color blindness information to the compensation processor.

2. The system of claim 1, wherein the compensation processor is structured to generate two color blind compensated signals for compensating for the first and a second type of color blindness, and further comprising means for selecting to output one of the first and the second adjusted color signals.

3. The system of claim 1, wherein the original color signal is associated with a series of ordered sets of original samples, and wherein each of the color blind compensated color signals is associated with a series of ordered sets of samples adjusted from the original samples according to a color gamut adjustment predefined for the different types of color blindness.

4. The system of claim 3, wherein the original samples represent original values, each original value associated with a content of a respective one of a plurality of predefined primary colors, the color blind compensated samples represent adjusted values, each adjusted value associated with a content of a respective one of the primary colors, and wherein the system further comprises a memory coupled with the processor and having stored therein the sets of original values and the first set of adjusted values.

5. The system of claim 4, further comprising means for combining the original samples of a single ordered set thereby generating a single sample for inputting into the memory as an address.

6. The system of claim 4, wherein the memory reads out a single sample for each input ordered set of original samples, and further comprising means for extracting from the sample output by the memory an ordered set of adjusted samples.

7. The video system of claim 1 wherein the compensation processor is structured to remap color points from the original signal by using a color lookup table.

8. The video system of claim 1 wherein the compensation processor is structured to remap color points from the original signal by using a color transformation algorithm.

9. A method for adjusting real time color images encoded in a video signal suitable for producing a display on a screen comprising:
decoding the video signal into at least one original color signal associated with a color of the original image;
using a reference color image to generate at least one reference color signal associated with a color of the reference image;
generating multiple adjusted signals from the reference color signal according to multiple pre-generated tested generic transforms associated with a different type of color blindness, the transforms non-modifiable by a user of the display, and the transforms not based on input from the user prior to and after the user takes a color blindness examination;
applying the adjusted signals to the screen at the same time, the screen thereby displaying at the same time multiple color images each adjusted for one of the different types of color blindness and displaying the multiple color images prior to testing the user for color blindness;
partitioning the screen into a plurality of sections, and displaying the multiple color images in the different sections;

accepting an input from the user selecting one of the multiple color images; and using the transform for the selected one of the displayed multiple color images for applying to an input video signal to compensate for color blindness of the user.

10. A method for adjusting real time color images encoded in a video signal suitable for producing a display on a screen comprising:

decoding the video signal into at least one original color signal associated with a color of the original image;

digitizing the original color signal to produce at least one original value;

generating an adjusted signal from the original color signal according to a first pre-generated transform associated with a first types of color blindness by looking up in a memory an adjusted value corresponding to the original value, the transform not-modified by a user prior to and after a user color blindness evaluation;

applying the adjusted signal to the screen, the screen thereby displaying color images adjusted for the first type of color blindness prior to conducting the user color blindness evaluation to determine a type of color blindness associated with the user;

selecting a set of coordinates for defining a color space;

selecting a type of color blindness;

characterizing the selected type of color blindness with respect to the coordinates as at least one discernible region in the color space;

selecting a color gamut adjustment that maps at least one region outside the discernible region into the discernible region, the adjustment including rotating at least a portion of one of the regions;

generating the original values and the adjusted values that perform the color gamut adjustment; and storing the original values and the adjusted values in a look up table in the memory.

11. The method of claim 10, wherein the memory is an EPROM, and wherein storing is performed by burning in the EPROM.

12. The method of claim 10, wherein selecting a color gamut adjustment includes contracting a portion of the discernible region.

* * * * *